Patented June 9, 1953

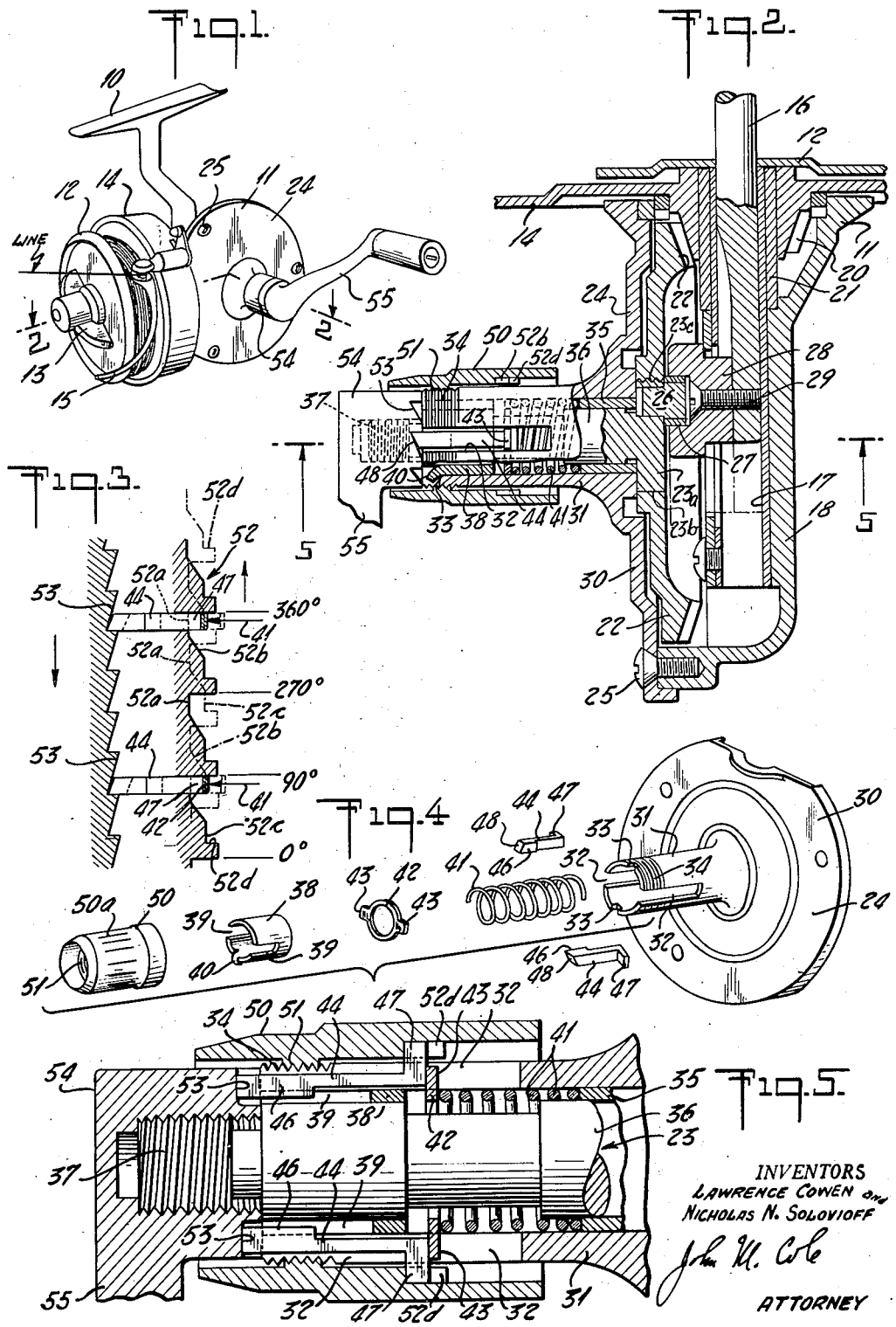

2,641,419

UNITED STATES PATENT OFFICE 2,641,419

FISHING REEL

Lawrence Cowen, New York, and Nicholas N. Solovioff, Great Neck, N. Y., assignors to Airex Manufacturing Co., Inc., Long Island City, N. Y., a corporation of New York Application April 30, 1949, Serial No. 90,726

13 Claims. (Cl. 242—84.5)

The present invention relates to fishing reels and is more particularly directed toward fishing reels provided with releasable anti-reverse mechanism which, when engaged, makes it impossible for pull exerted on the line to reverse the winding mechanism.

In fishing reels of the spinning reel type, the line is wound by a pick-up device on to a non-rotating reciprocable spool driven through a gear-train by a winding crank. Friction drag mechanism, forming no part of the present invention, interconnects the spool and the spool carrying shaft so as to determine the drag imposed upon the line and permit it to be unwound on excess pull. The pull on the line is transmitted to the spool and its shaft through the pick-up tending to turn the latter backward and drive the crank backward. During the cast in such type of reel, the pick-up is released, the line comes off the reel without turning the reel, the winding mechanism remaining in position without movement.

The present invention contemplates providing reels of the above type with ratchet and pawl mechanism which does not interfere with retrieving the line by operating the crank handle, but which prevents reverse movement of the mechanism when the pawls are in position to engage the cooperating ratchet.

According to the present invention, the ratchet and pawl mechanism is associated with the crank shaft and the parts are located so as to be convenient for manipulation by the user of the reel to render the anti-reverse mechanism effective or ineffective at will.

By placing the anti-reverse mechanism on the driving shaft and associating it with the operating crank, it is possible to utilize substantially all of the remaining parts of the reel without change. According to the present invention, the bearing portion of the housing which carries the driving shaft is slotted to accommodate pawls reciprocable parallel with the shaft axis, and these pawls are arranged to be protracted by a spring and retracted by manually shiftable cam mechanism. A further object of the invention is to so arrange the cam retracted mechanism as to facilitate adjustment of pawl position during the assembly of the structure.

Other and further objects will appear as the description proceeds.

The accompanying drawings show, for purposes of illustrating the present invention, one embodiment in which the invention may take form, it being understood that the drawings are illustrative of the invention rather than limiting the same.

In the accompanying drawings:

Figure 1 is a perspective view of the complete reel;

Figure 2 is a sectional view through the plane 2, 2 of Figure 1;

Figure 3 is a developed view showing the ratchet and pawl mechanism and ratchet controlling cam viewed across the axis;

Figure 4 is an exploded view showing the separate mechanism of the anti-reverse mechanism; and Figure 5 is a cross-sectional view taken on the line 5—5 of Figure 2, parts being omitted.

The reel shown in the drawings has the usual seating member 10 for securing it to the fishing rod, casing 11, spool 12, adjustable drag 13, spinner cup 14, and line pick-up 15, the spool 12 secured to a spool shaft 16 reciprocably and non-rotatably mounted in a tube 17 carried in the casing part 18, and the spinner cup 14 carrying a bevel pinion 20 provided with a bushing 21 revolvable about the tube 17 and meshing with a bevel gear 22. The gear 22 is a die casting secured to a driving shaft 23 having a flange 23a with flat 23b and groove 23c. The shaft 23 is carried in the casing part 24 secured to the casing part 18 by screws 25. The inner end of the shaft 23 carries a pin 26 received in a recess 27 in a member 28 secured to the shaft 16 by a screw 29. Rotation of the gear 22 causes reciprocation of the shaft 16 and the spool as usual. The casing part 24 is in the form of a die casting having a generally circular flange portion 30 and a tubular extension 31.

In practicing the present invention, this portion of the casing and the adjacent parts form the anti-reverse mechanism. Here the extension 31 is provided with two comparatively long slots 32, 32 and two notches 33, 33. It is threaded at the end as indicated at 34. The inner end receives the bushing 35 through which the reduced portion 36 of the shaft 23 extends. The outer end of the shaft 23 is threaded as indicated at 37. The outer end of the tubular member 31 carries an outer bushing 38, having slots 39, 39 aligned with the slots 32, 32 and with a prong 40 bent over into one of the notches 33. The space between the bushings 35 and 38 is occupied by an expansion spring 41 and the washer 42 having outwardly extending lugs 43, 43 entering the slots 32, 39. The body portion of these pawls is small enough to be inside the root of the threads 34. Near the outer end each pawl is thickened as indicated at 46 to enter the slot 39 in bushing 38, giving it greater bearing area. At the inner end each pawl is provided with an outwardly extending lug 47 projecting beyond the surface of the tubular member 31. The extreme outer end of the pawl is beveled as indicated at 48.

A sleeve 50 is threaded as indicated at 51 to fit the threads 34. The sleeve extends rearwardly about the pawls and has cam surfaces the development of which is shown at 52 in Figure 3. These surfaces repeat each 90°. When the parts are in the position shown in Figure 3, the pawls are in protracted position, the spring 41 applying pressure to the left as indicated by the arrows and urging the lugs 47 toward the low parts 52a of the cam surface. Turning the sleeve through somewhat less than 90° will cause the lugs 47 to engage the sloping cam surface 52b, retracting the pawls to the dotted position shown in Figure 3. Further turning of the sleeve to bring the flat surfaces 52c of the cam under the lugs 47 will hold the pawls in retracted position. The surfaces 52d provide stops to limit the turning of the sleeve.

When the pawls are in protracted position, the lugs 47 are displaced slightly from surfaces 52a, their ends being in engagement with ratchet teeth 53 carried by hub 54 of a crank 55 threaded on to the end of the shaft 23. As reels of this type are operated by the left hand, the threads 37 are left-handed threads and the ratchet and pawls are arranged so as to permit turning the crank in a counter-clockwise direction (Fig. 1) to wind in or retrieve the line. Any pull exerted against the line, however, is opposed by the ratchet and pawl arrangement so that no reverse operation can take place.

The sleeve 50 is provided with ridges 50a to facilitate turning it by the thumb and finger of the hand normally used in operating the crank. The sleeve can be turned back and forth so as to retract the pawls or release them for protraction by the spring. When the pawls are retracted, the reel mechanism can be turned backward the same as in reels without anti-reverse mechanism, and when the spinner cup is grasped, the crank can be unwound from the shaft.

During the manufacture and assembly of the reel, it is desirable to be able to accurately place the pawls so that they will properly cooperate with the ratchet teeth. In the present construction, this is readily accomplished by using a tool which will press the pawls back far enough to clear the cam surfaces in the sleeve 50. The sleeve can then be turned a partial revolution so as to move it back and forth along the axis of the tubular member 31. This makes it possible to secure back and forth adjustment of the pawls in amounts equal to one-fourth of the pitch of the threads 51.

Since it is obvious that the invention may be embodied in other forms and constructions within the scope of the claims, we wish it to be understood that the particular form shown is but one of these forms, and various modifications and changes being possible, we do not otherwise limit ourselves in any way with respect thereto.

What is claimed is:

1. A fishing reel comprising a gear casing having a cover plate with a laterally extending tubular element having an outwardly facing internal shoulder and two outwardly opening elongated slots in its side walls, a driving gear in the casing and having a shaft in the tubular element, a coiled expansion spring about the shaft and bearing on the internal shoulder, a washer about the shaft, the washer engaging the other end of the spring and having lugs entering the slots in the tubular element, pawls reciprocally carried in the slots, a sleeve carried by the tubular element and movable to two positions in one of which it holds the pawls retracted and in the other of which it releases the pawls for limited movement and holds them against removal, and a ratchet member rotatable with the shaft and engageable by the pawls when the sleeve releases them.

2. A fishing reel as claimed in claim 1, wherein the sleeve is mounted for angular movement and has pawl retracting cams.

3. A fishing reel as claimed in claim 1, wherein the sleeve is threaded onto the tubular element for adjustment therealong and has pawl retracting cams.

4. A fishing reel as claimed in claim 1, wherein the tubular element non-rotatably carries a bushing for the outer end of the shaft, the bushing having slots aligned with the slots in the tubular member, the pawls also entering the latter mentioned slots.

5. A spinning reel having a body provided with a laterally extending bearing member, a crank operated driving shaft carried therein, ratchet teeth movable with the shaft, axially movable pawls non-rotatably carried by the bearing member, a pawl spring urging the pawls toward the ratchet teeth, and an angularly shiftable sleeve carried by the bearing member and having pawl retracting means effective when in one position to withdraw the pawls from the ratchet teeth and effective in the other position for releasing them for protraction by the spring.

6. In a winding mechanism having line winding means which tends to be driven backwardly by pull on the line, a driven shaft in driving relation with the line winding means, a releasable one-way drive for the shaft comprising a crank threaded into the end of the shaft in the direction of drive and carrying inwardly facing ratchet teeth, a tubular shaft housing carrying an inner bushing and an outer bushing, the outer bushing and the shaft housing having outwardly open aligned slots, a washer behind the outer bushing and having lugs projecting into the housing slots, an expansion spring between the washer and the inner bushing, pawls slidably wound in the slots, and a sleeve carried by the housing about the pawls and having cams to retract the pawls and stop shoulders to limit the protraction of the pawls.

7. In a spinning reel having a non-rotating spool, a reduction gear-driven line-winding mechanism adapted to be rotated in one direction for winding line about the spool and on pull on the line to transmit torque in an unwinding direction, a one-way driving mechanism comprising a gear driving shaft, a handle having a hub threaded onto the end of the shaft for turning it in one direction, ratchet teeth on the hub, pawls reciprocable in directions parallel with the shaft axis, a spring pressing them toward the ratchet teeth, and a cam carrying sleeve for retracting the pawls from the teeth.

8. An anti-reverse mechanism for fishing reels having a winding shaft, comprising a tubular shaft member having a portion of reduced diameter forming a shaft bearing and providing an outwardly facing shoulder, a bushing non-rotatably received in the outer end of the tubular member and spaced therefrom, the member having slots extending from its outer end beyond the bushing, a washer behind the bushing and having lugs extending through the slots, an expansion spring between the shoulder and washer, the bushing having short slots aligned with the other slots, a pawl slidably received in each pair of aligned slots, the inner end of the pawl bearing against the washer lugs and being provided with radially extending fingers, a sleeve threaded on the tubular member and having axially and angularly displaced finger engaging surfaces interconnected by camming surfaces for retracting the pawls or releasing them for protraction by the spring, and a shaft operating crank having a hub provided with ratchet teeth cooperable with the pawls to prevent reverse turning of the shaft when the pawls are protracted.

9. An anti-reverse mechanism for fishing reels as claimed in claim 8, wherein the sleeve has stops engageable with the pawl fingers for limiting angular movement of the sleeve when the pawls are in retracted or protracted position, and wherein the pawl fingers may move beyond the sleeve stops to permit longitudinal adjustment of the sleeve by turning it on the threaded member.

10. A spinning reel having a body provided with a laterally extending bearing member, a driving shaft carried therein, a hand crank for operating the shaft, ratchet teeth movable with the shaft, the bearing member having longitudinally extending slots, axially movable pawls non-rotatably carried in said slots of the bearing member, a coiled pawl spring about the shaft and urging the pawls toward the ratchet teeth, and an angularly shiftable sleeve carried by the bearing member adjacent the hand crank and having pawl retracting means effective when in one position to withdraw the pawls from the ratchet teeth and effective in the other position for releasing them for protraction by the spring.

11. A spinning reel such as claimed in claim 10, wherein the sleeve is angularly adjustable about the shaft and has internal pawl retracting cams, and the pawls extend radially beyond the slots to engage the cams.

12. A spinning reel such as claimed in claim 10, wherein the sleeve and bearing member are threaded together, and the sleeve closes the slots outside the pawls to keep the pawls in the slots.

13. In a spinning reel having a non-rotating spool, a reduction gear-driven line-winding mechanism adapted to be rotated in one direction for winding line about the spool and on pull on the line to transmit torque in an unwinding direction, and a body supporting the spool and line-winding mechanism, a one-way driving mechanism comprising a body-carried, gear driving shaft, a handle having a hub threaded onto the end of the shaft for turning it in one direction, ratchet teeth on the hub, body-carried pawls reciprocable in directions parallel with the shaft axis, a spring pressing the pawls toward the ratchet teeth, and a body-carried sleeve having a cam for retracting the pawls from the teeth.

LAWRENCE COWEN.
NICHOLAS N. SOLOVIOFF.

References Cited in the file of this patent

UNITED STATES PATENTS

| Number | Name | Date |
|---|---|---|
| 222,689 | Garver et al. | Dec. 16, 1879 |
| 1,271,429 | Burt | July 2, 1918 |
| 1,890,736 | Lenz | Dec. 13, 1932 |
| 1,892,276 | Johnson | Dec. 27, 1932 |
| 1,981,429 | Scott | Nov. 20, 1934 |
| 2,182,423 | Cabassa | Dec. 5, 1939 |
| 2,339,530 | Van Settert et al. | Jan. 18, 1944 |
| 2,344,209 | Lowe | Mar. 14, 1944 |
| 2,546,465 | Martini | Mar. 27, 1951 |
| 2,548,073 | Siegrist | Apr. 10, 1951 |

FOREIGN PATENTS

| Number | Country | Date |
|---|---|---|
| 834,358 | France | Aug. 16, 1938 |